United States Patent [19]
Maeda et al.

[11] Patent Number: 5,860,087
[45] Date of Patent: Jan. 12, 1999

[54] DATA SEARCH METHOD WHEREIN THE COURT-KEY-DATA (CKD) STORAGE SUBSYSTEM DISCONNECTS FROM THE CENTRAL PROCESSING UNIT WHEN SEARCHING

[75] Inventors: Masami Maeda; Hidetoshi Sakaki; Toshiaki Hatanaka, all of Odawara; Hiroshi Nishizima, Mishima; Yukio Myoujin, Kanagawa, all of Japan

[73] Assignees: Hitachi, Ltd., Tokyo; Hitachi Computer Peripherals Co., Ltd., Odawara, both of Japan

[21] Appl. No.: 601,941

[22] Filed: Feb. 15, 1996

[30]  Foreign Application Priority Data

Feb. 20, 1995 [JP] Japan .................................. 7-030431

[51] Int. Cl.$^6$ ...................................................... G06F 13/36
[52] U.S. Cl. ............................ 711/112; 395/825; 395/840
[58] Field of Search .................................. 395/438, 439, 395/440, 825, 840; 711/111, 112, 113

[56]  References Cited

U.S. PATENT DOCUMENTS

| | | | |
|---|---|---|---|
| 4,068,301 | 1/1978 | Ishino et al. ............................. | 395/444 |
| 4,875,155 | 10/1989 | Iskiyan et al. .......................... | 395/440 |
| 5,060,142 | 10/1991 | Menon et al. ........................... | 395/825 |
| 5,235,692 | 8/1993 | Ayres et al. ............................. | 395/849 |
| 5,388,013 | 2/1995 | Nakamura ................................ | 360/48 |
| 5,448,700 | 9/1995 | Kim ........................................ | 395/310 |
| 5,535,372 | 7/1996 | Benhase et al. ......................... | 395/500 |

FOREIGN PATENT DOCUMENTS

| | | |
|---|---|---|
| A02148321 | 6/1990 | Japan . |
| 2247716 | 10/1990 | Japan . |

OTHER PUBLICATIONS

*IBM Technical Disclosure Bulletin*, "Utilizing Multiple Exposure", by Anonymous vol. 13, No., Dec. 1970, pp. 1996–1998.

*IBM Technical Disclosure Bulletin*, "Direct Access Storage Control Disconnect", by Anonymous, vol. 14, No. 6, Nov. 1971, pp. 1718–1719.

(List continued on next page.)

*Primary Examiner*—Tod R. Swann
*Assistant Examiner*—Christopher S. Chow
*Attorney, Agent, or Firm*—Antonelli, Terry, Stout & Kraus, LLP

[57]  ABSTRACT

For a computer system having a central processing unit, an external storage unit which records data in a count-key-data (CKD) format, and a storage control unit with a cache memory for controlling data transfer between the external storage unit and the central processing unit, a computer system and data search method is provided which can prevent the performance of the central processing unit from being lowered and can eliminate signal transfer between the central processing unit and storage control unit during most of a data search operation period, by disconnecting the storage control unit from the central processing unit. During the data search operation, upon reception of a search command for the first record, a quasi completion report is issued to disconnect the storage control unit from the central processing unit. The storage control unit executes the search operation by using data loaded in the cache memory of the storage control unit. After data is searched, a search completion report is issued. Since the storage control unit is disconnected from the central processing unit during most of the data search operation period, the central processing unit is not occupied during this period by the storage control unit. Signal transfer is therefore unnecessary between the central processing unit and storage control unit during the data search operation period, making it possible to elongate a physical distance between the central processing unit and storage control unit.

14 Claims, 6 Drawing Sheets

OTHER PUBLICATIONS

*IBM Technical Disclosure Bulletin,* "System Reset Protection Synchronous Cache System Destaging", by Anonymous, vol. 25, No. 11B, Apr. 1983, 5883–5885.

*IBM Technical Disclosure Bulletin,* "DASD Fast–Write Buffering" by Anonymous, vol. 36, No. 10, Oct. 1993, pp. 359–352.

IBM TDB, "Record Mode Extention to Track Mode Caching DASD Subsystem", Anonymous, vol. 32, No. 11 (only a fragment was considered, consult file wrapper for details), Apr. 1990.

IBM TDB, "Efficient Channel Utilization in a Non–Sync Control Unit", Anonymous, vol. 36, No. 11, (only a fragment was considered, consult file wrapper for details), Nov. 1993.

DATA SEARCH METHOD WHEREIN THE COURT-KEY-DATA (CKD) STORAGE SUBSYSTEM DISCONNECTS FROM THE CENTRAL PROCESSING UNIT WHEN SEARCHING

BACKGROUND OF THE INVENTION

1. Field of the Invention

The present invention relates to a method of searching data sets (data of a collection of members constituted by a kind of sequential data set) stored in an external storage unit of a computer system, and more particularly to a method of searching data recorded in a count-key-data format.

2. Description of the Related Art

FIG. 1 is a block diagram of a conventional computer system. This computer system includes a central processing unit 1 (hereinafter abbreviated as CPU 1), a storage control unit 2 (hereinafter abbreviated as DKC 2), and an external storage unit (hereinafter abbreviated as DKU 3). DKC 2 has a controller 4 for providing a function of issuing a quasi-completion report and a function of automatically and continuously performing a search operation. In some cases, the computer system has a cache memory 6 for temporarily storing data.

A count-key-data format is known as one of the data record formats of an external storage unit of such a computer system. With this format, a certain number of variable length records are stored in one track. One record is constituted by: a count field for storing an address of its record and the lengths of a key field and a data field respectively allocated after the count field; the key field for storing a key representative of an identification of the record; and the data field for storing data.

FIG. 2 shows a count-key-data format for searching data of a collection of members constituted by a kind of sequential data set. In FIG. 2, C represents a count field, K represents a key field, and D represents a data field. If a data format allows to discriminate data in a data field from other data fields by using data in its key field, as in the case of data constituted by members stored in a directory of partitioned organization data sets, a search operation is performed, for example, by reading the data stored in the key fields 23 to 25 without reading all the data stored in the records 20 to 22.

In a computer system having a central processing unit, a storage control unit, and an external storage unit with the count-key-data format, if the external storage unit has no cache memory, the central processing unit issues a search command for the count-key field of each record during the search operation. On the other hand, the storage control unit receives a search command, searches data, and sends a search completion report for each record. Data read from the external storage unit is temporarily stored in a data buffer of the storage control unit, for the search operation.

FIG. 3 is a schematic diagram illustrating conventional data search operation and control signal transfer when DKC 2 has no cache memory or when DKC 2 has a cache memory and there is a cache miss for search data.

At the connection state of DKC 2 and CPU 1, search data instructed by CPU 1 for each key field is compared with data in the key field read from DKU 3. If this comparison indicates that the data in the key field is equal to, or larger than, member data instructed by CPU 1, a search completion report for the data in the key field is supplied to CPU 1. In accordance with data read from the key fields (collection of members) and member data instructed by CPU 1, the record locations of data sets on DKU 3 are identified and these data sets are subjected to a further process.

Even if the comparison indicates that the data in the key field is smaller than the member data instructed by CPU 1, the search completion report for the data in the key field is supplied to CPU 1. In this case, a search operation for the key field of the next record is performed. If the comparison condition between member data and key field data is not satisfied even after the search process of the last record in the track, DKC 2 starts the search process for the next track (key field search, i.e., comparison) upon reception of an instruction from CPU 1. In this manner, DKC 2 supplies CPU 1 with completion reports (channel END, device END) of processes by DKC 2 inclusive of DKU 3, each time one key field is searched, irrespective of whether or not the comparison condition is satisfied.

In FIG. 3, DKC 2 reads records 30 to 32 from DKU 3 and compares the data in the key fields 33 to 35 of these records with member data instructed by CPU 1. The order of processing is the ascending order of record numbers (30→31→32). CPU 1 issues a key search command 36, and in response to this DKC 2 performs the search operation for the record 30 and issues a completion report 37 to CPU 1 irrespective whether or not the comparison condition is satisfied. If the comparison condition is satisfied, DKC 2 starts reading data in the data field D 38. If not satisfied, another key search command 39 is issued for the key field 34 of the next record 31 to repeat a search process for the key field 34 and a completion report 40. In this manner, until the comparison condition is satisfied, search processes for the key fields of succeeding records are sequentially executed, and DKC 2 receives a search command and returns a completion report for each record.

In IBM manual GG24-3886-00, IBM Storage Subsystem Enhancements, a search process is disclosed in which, if data is already stored in a cache memory of a storage control unit (if there is a cache hit), the search operation continues using this data under the operation of the storage control unit, while the central processing unit maintains connection to the storage control unit.

FIG. 4 is a schematic diagram illustrating conventional search operation and signal transfer when DKC 2 has a cache memory and there is a cache hit. Upon reception of a search instruction from CPU 1, DKC 2 returns a cache hit report 45. Thereafter, CPU 1 issues a key search command for the first record. After the search operation for the data in the cache memory is completed by the operation of DKC 2, a completion report 46 is issued to CPU 1. During this search operation 47 by DKC 2, although CPU 1 and DKC 2 maintain connection, there is no signal transfer therebetween for each key field (each record).

Even if the cache memory 6 does not store data (even if there is no cache hit), CPU 1 issues a search command for each record and DKC 2 reads data from DKU 3 and searches while using the cache memory 6, and thereafter issues the search completion report.

Therefore, CPU 1 is occupied by a particular DKC 2 during the data search operation, irrespective of whether DKC 2 uses a cache memory or whether there is a cache hit.

Apart from the above, DKC 2 with a cache memory can load data from DKU 3 into the cache memory by disconnecting DKC 2 from CPU 1 (generally called off-line load).

SUMMARY OF THE INVENTION

As described above, a particular storage control unit under a search operation occupies the central processing unit irrespective of whether the storage control unit has a cache memory or whether there is a cache hit. Accordingly, the performance of the central processing unit is lowered (prolonging a channel busy time).

Furthermore, unless data is already stored in the cache memory, a search command and a completion report are repeated for each search key (each record) until the search operation is fully completed. Still further, a signal transfer operation during the search operation is required to be completed in a specified period, and an over-run error is generated if it is not completed in the specified period.

The physical distance between the central processing unit and storage control unit, which are connected by a cable, is becoming longer. Accordingly, there is another problem in that increased signal transmission time over a longer cable makes it difficult to complete the signal transfer operation in the specified period.

It is an object of the present invention to provide a storage subsystem and a method of searching data from the storage subsystem, capable of preventing the performance of a central processing unit from being lowered, by executing a search operation without occupying the central processing unit.

It is another object of the present invention to provide a storage subsystem and a method of searching data from the storage subsystem, capable of preventing an over-run error by executing a search operation without performing a search command and a completion report for all records.

According to one aspect of the invention, a data search method for a storage control unit with a memory unit (cache memory) for storing at least one track data read from an external storage unit, is provided in which for a data search operation, a quasi completion report is issued in response to a search command for the first record, to disconnect a central processing unit from the storage control unit, and thereafter the search operation is executed only by the inter-operations between the storage control unit and external storage unit.

According to the data search method of this invention, whether or not the cache memory has already stored search data is checked by the storage control unit when a search command is received from the central processing unit.

If the search data is judged to be a cache miss, the storage control unit directly accesses the external storage unit to read data. The controller of the storage control unit issues a quasi completion report for the first record to disconnect the storage control unit from the central processing unit. The storage control unit reads at least one track data from the external storage unit and loads it into the cache memory. By using the data loaded into the cache memory, the storage control unit executes the search operation while disconnecting it from the central processing unit. When the search operation is completed, the storage control unit is again connected to the central processing unit and a completion report is transmitted thereto.

If the search data is judged to be a cache hit, the controller of the storage control unit issues a quasi completion report to disconnect the storage control unit from the central processing unit. The storage control unit performs the search operation while disconnecting it from the central processing unit. When the search operation is completed, the storage control unit is again connected to the central processing unit and a completion report is transmitted thereto.

Signal transfer between the central processing unit and storage control unit is therefore unnecessary during most of the search operation period, and thus the performance of the central processing unit is improved and the generation of an over-run error can be suppressed.

DETAILED DESCRIPTION OF THE PREFERRED EMBODIMENTS

A data search method for a storage control unit (DKC) according to an embodiment of the invention will be described with reference to the accompanying drawings.

Figure 1:
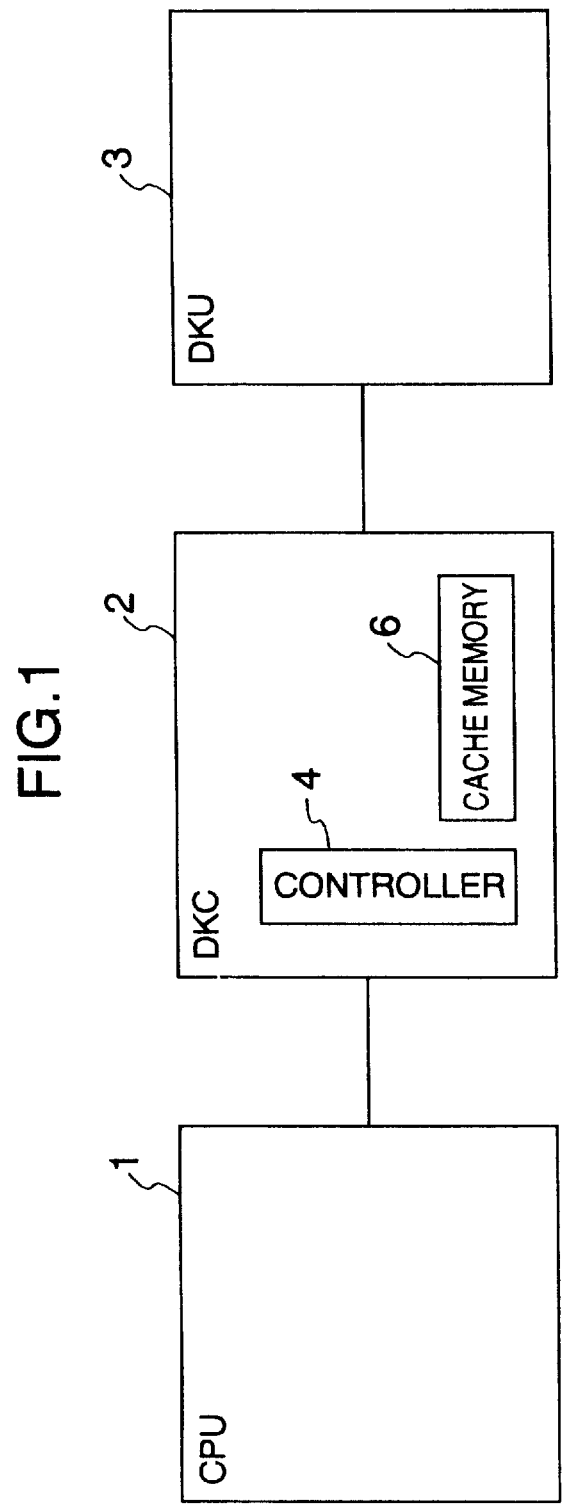
FIG. 1 is a block diagram of a computer system according to an embodiment of the invention.
Figure 2:
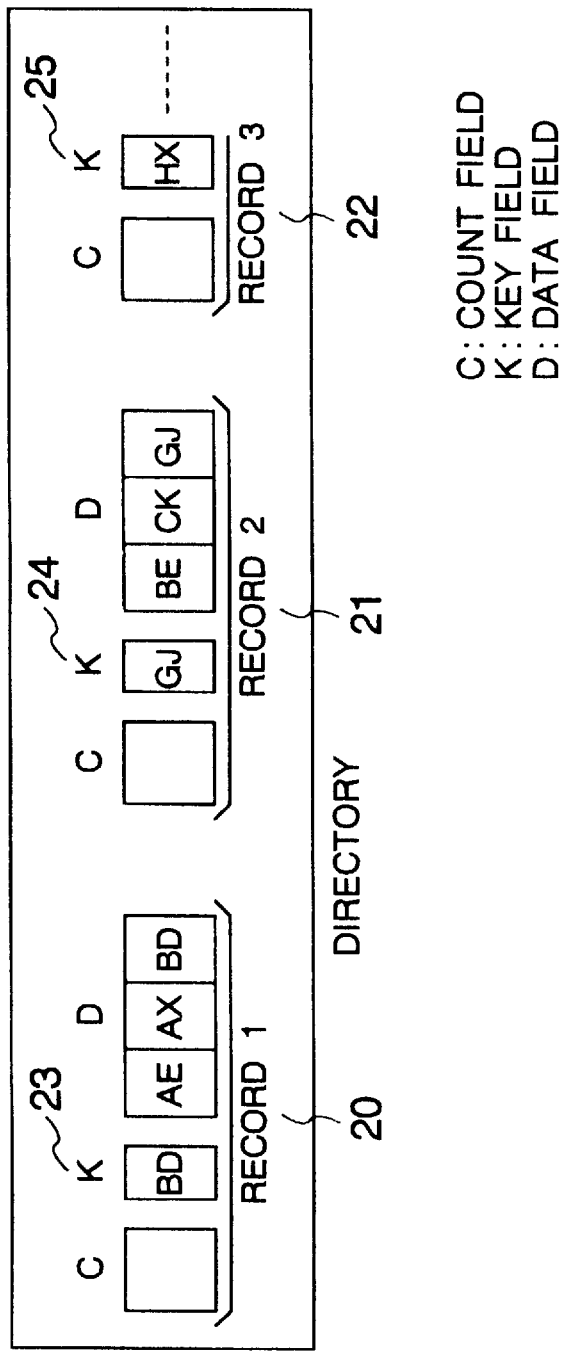
FIG. 2 shows an example of a search data format.

The structure of a computer system is generally similar to that of a conventional computer system shown in FIG. 1. This computer system has a cache memory 6 capable of storing data of at least one track. The data format used by an external storage unit DKU 3 is the same as the conventional format shown in FIG. 2.

Figure 5:
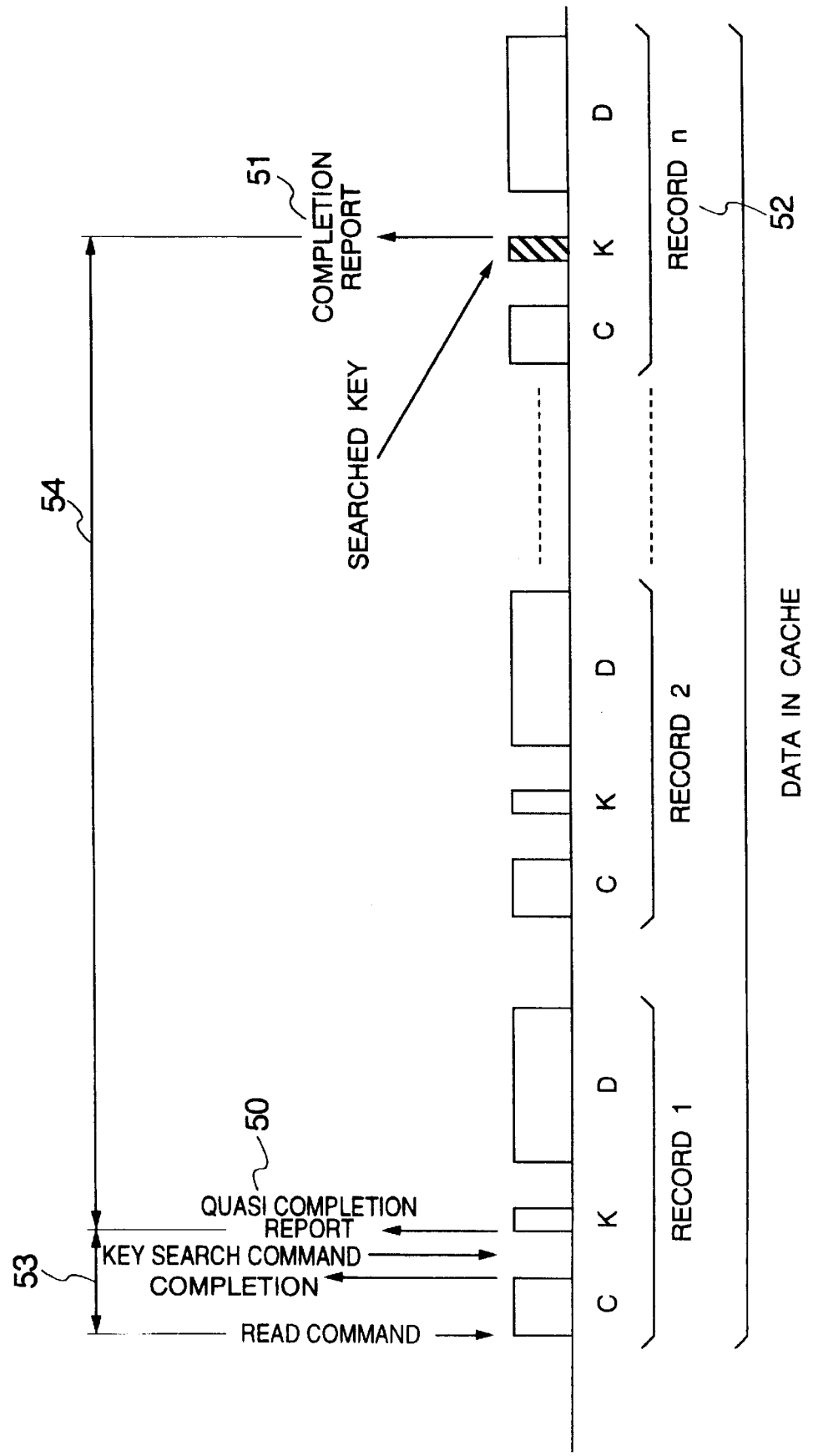
FIG. 5 illustrates a data search operation according to an embodiment of the invention.

FIG. 5 illustrates signal transfer according to the embodiment of the invention. If there is no data in the cache memory 6, a data control unit DKC 2 reads data of at least one track (several track data may be prefetched), and loads it in the cache memory 6.

In response to a key search command for the first record, a controller 4 of DKC 2 issues a quasi completion report (channel END) 50 to a central processing unit which indicates a completion of processing between DKC 2 and a central processing unit CPU 1, and disconnects DKC 2 from CPU 1. During a data search operation to be followed thereafter, data in the key fields stored in the cache memory 6 is repetitively searched under the operation of the controller 4 of DKC 2, until object data is searched (until a comparison condition is satisfied).

If the comparison condition is satisfied, and when the process for DKU 3 is completed, a completion report (device END) 51 is issued to CPU 1, the completion report having the same object as a conventional system and requesting a signal for reading the data field D of the record. The processes after reading the data field D of the record (n=52) are performed by referring to the data in the cache memory 6.

If the comparison condition is not satisfied, even if all track data in the cache memory 6 is searched, the key search for the track is terminated and a completion report (device END) inclusive of the last record number is issued. If there is a command from CPU 1, the search operation for the next track starts. In this case, if there is already prefetched data of the next track, this data is used.

Figure 6:
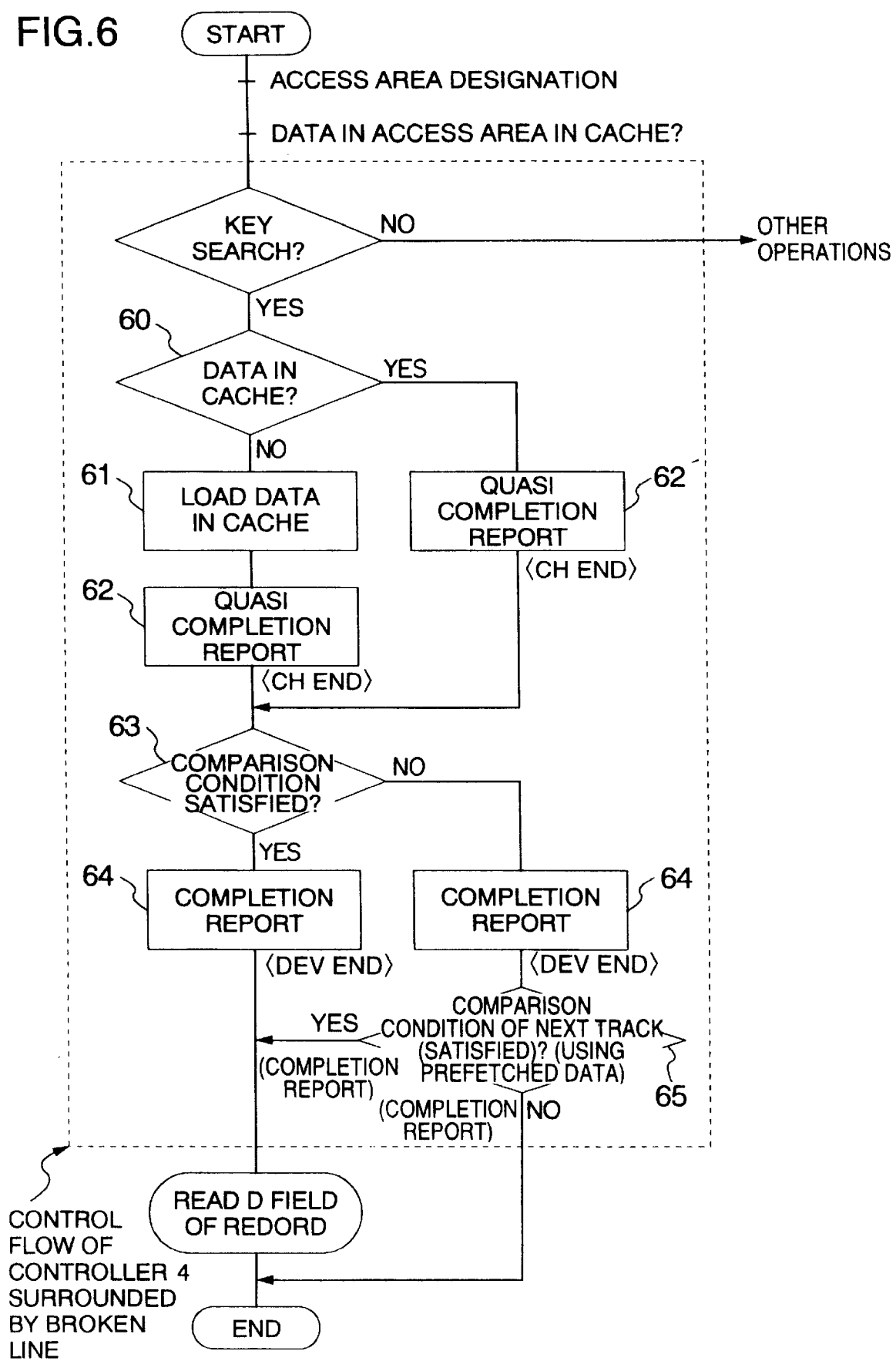
FIG. 6 is a flow chart illustrating the operation of a controller according to an embodiment of the invention.

FIG. 6 is a flow chart illustrating the operation of the controller 4 according to an embodiment of the invention. The controller 4 first checks if the search command received by DKC 2 is a key field search. If it is not a key field search, other or conventional search operations are performed. If it is a key field search, it is checked as to whether the cache memory has already stored the search data (Step 60) or not.

If the cache memory has not already stored the search data, data in the track (or prefetched tracks) is read and loaded in the cache memory (Step 61). The controller 4 then issues a quasi completion report (channel END) (Step 62), and disconnects DKC 2 from CPU 1. Thereafter, the comparison condition is checked by using the data in the cache memory 6 (Step 63).

If the cache memory has already stored the search data, the controller 4 issues a quasi completion report (channel END) (Step 62'), and disconnects DKC 2 from CPU 1. Thereafter, the comparison condition is checked with respect to the key field by using the data in the cache memory 6 (Step 63).

If the comparison condition is not satisfied, the controller 4 issues a completion report (Step 64) to perform a search operation for the next track (Step 65). In this case, if the data of the next track has been prefetched in the cache memory, this data is used. If the comparison condition is satisfied, the controller 4 issues a completion report (Step 64), and DKC 2 reads the data of the data field D of the record.

In the embodiment of this invention, the connection time of CPU 1 to DKC 2 is a period 53 shown in FIG. 5, and CPU 1 and DKC 2 are disconnected during a period 54. Also in this embodiment, the number of signal transfers between CPU 1 and DKC 2 required for the key search is small as illustrated in FIG. 5.

Figure 3:
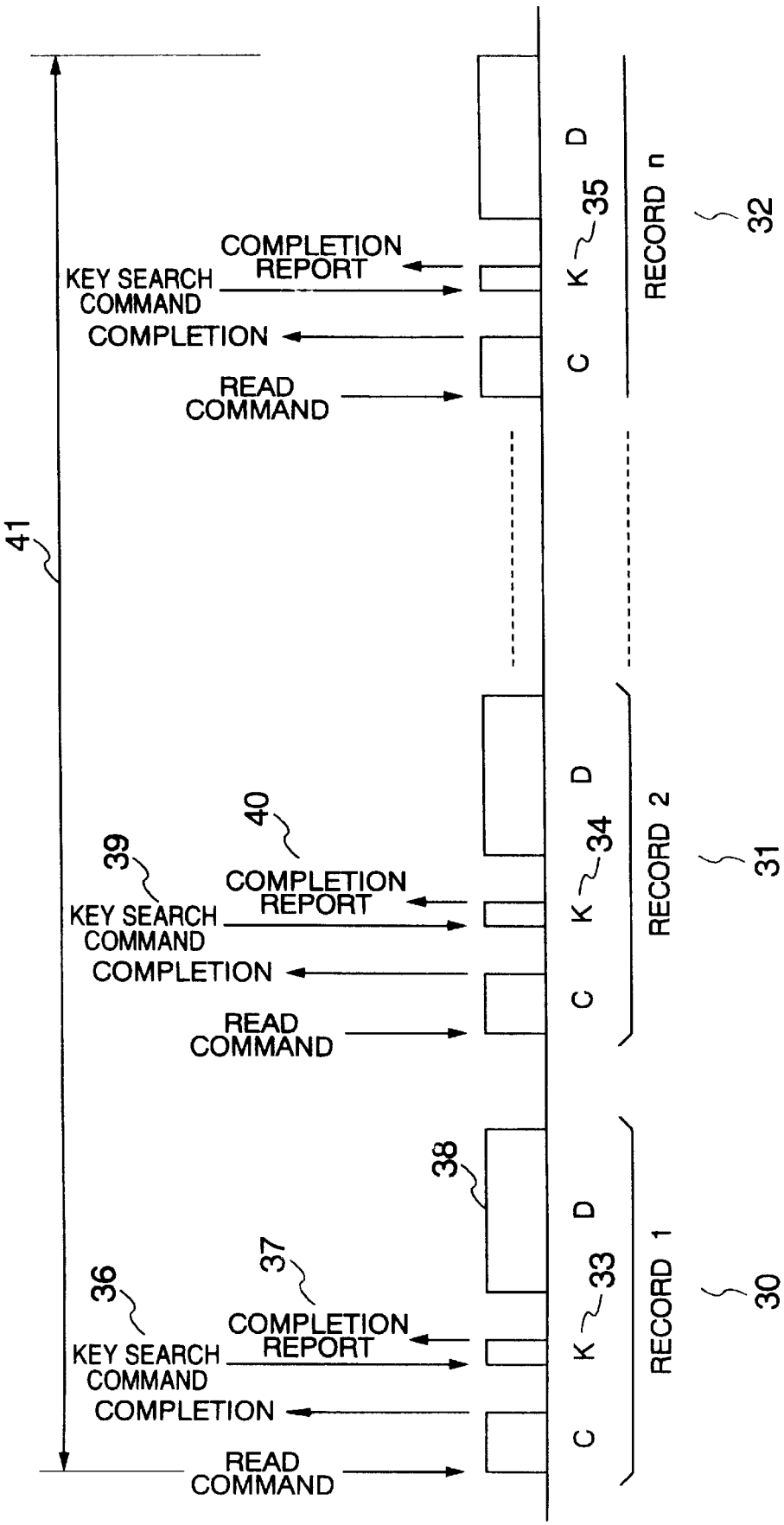
FIG. 3 illustrates a conventional data search operation without a cache hit.
Figure 4:
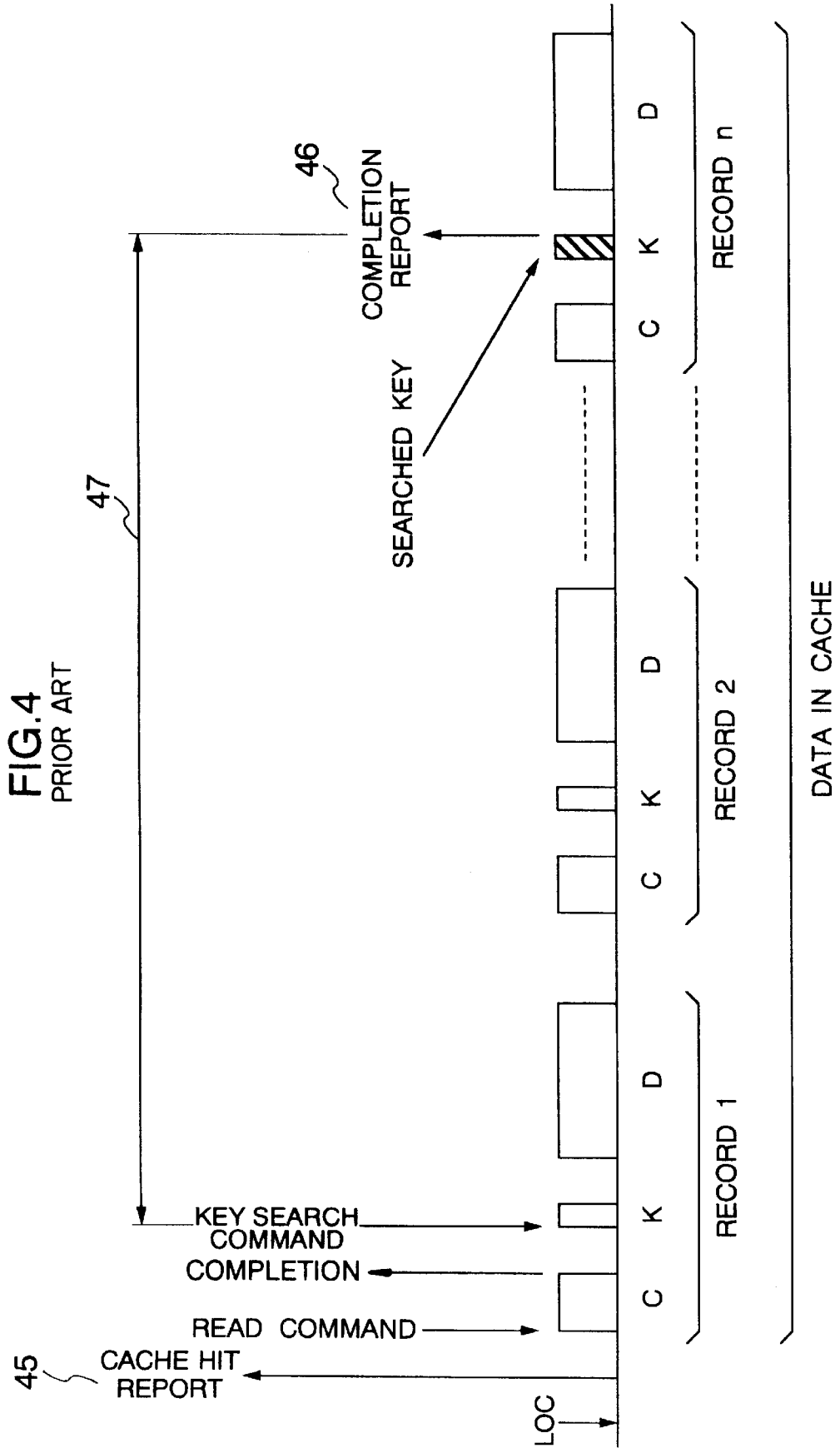
FIG. 4 illustrates a conventional data search operation with a cache hit.

In a conventional system, however, the connection time of CPU 1 to DKC 2 is a period 41 shown in FIG. 3, during which a signal is transferred for each key field (each record) between CPU 1 and DKC 2. Also in the case of a conventional DKC 2, the connection time of CPU 1 to DKC 2 when the search data is cache-hit is a period 47 shown in FIG. 4, during which a signal is not transferred for each key field between CPU 1 and DKC 2.

The invention improves the performance of CPU 1 because DKC 2 under the search operation scarcely occupies CPU 1.

According to the invention, when data is to be searched, a quasi completion report is issued to disconnect DKC 2 from CPU 1 and the search operation is performed using data stored in the cache memory without occupying CPU 1. It is therefore possible to prevent the CPU performance from being lowered. Also during most of the search operation period, signal transfer between CPU 1 and DKC 2 is not necessary. It is therefore possible to suppress the generation of an over-run error and to elongate a physical distance between CPU 1 and DKC 2.

What is claimed is:

1. A data searching method for a storage subsystem connected to a central processing unit, said storage subsystem having an external storage unit for storing data as a plurality of records and a storage control unit for controlling data transfer between said external storage unit and said central processing unit, wherein said storage subsystem disconnects said central processing unit after said storage subsystem receives a search command from said central processing unit, and said storage subsystem performs a data search of said plurality of records.

2. A data searching method for a storage subsystem connected to a central processing unit, said storage subsystem having an external storage unit for storing data as a plurality of records and a storage control unit for controlling data transfer between said external storage unit and said central processing unit, and said storage control unit having memory means for temporarily storing data as a plurality of records, wherein upon reception of a search command from said central processing unit, said storage subsystem supplies a signal to said central processing unit, said signal indicating a termination of operation of said storage subsystem with said central processing unit, disconnects said central processing unit, and performs a search of search data in said memory means.

3. A data searching method according to claim 2, wherein said storage subsystem checks whether said memory means has search data, and if said memory means has the search data, said storage subsystem issues a quasi completion record to said central processing unit to disconnect said central processing unit, and if said memory means has no search data, said storage subsystem reads search data from said external storage unit and loads the read search data in said memory means, and issues a quasi completion record to said central processing unit to disconnect said central processing unit.

4. A data searching method for a storage control unit connected to an external storage unit for storing data as a plurality of records, each record having a count field, a key field, and a data field, and to a central processing unit, said storage control unit having a cache memory and controlling data transfer between said external storage unit and said central processing unit, wherein upon reception of a key search command from said central processing unit, said storage control unit issues a quasi completion report to said central processing unit, disconnects said central processing unit, and executes a key field comparison with a search track having a plurality of said records in said cache memory, and if a condition of said key field comparison is satisfied, said storage control unit issues a completion report to said central processing unit to terminate a key search, and if the condition of said key field comparison is not satisfied, said storage control unit executes said key field comparison with the next track.

5. A data searching method according to claim 4, wherein said storage control unit checks whether said cache memory has a search track, and if said cache memory has the search track, said storage control unit issues said quasi completion report to said central processing unit and disconnects said central processing unit, and if said cache memory has no search track, said storage control unit reads a search track from said external storage unit, loads the read search track in said cache memory, issues said quasi completion report to said central processing unit, and disconnects said central processing unit.

6. A data search method according to claim 5, wherein when said storage control unit reads a search track from said external storage unit, said storage control unit prefetches several search tracks and loads the prefetched several search tracks in said cache memory.

7. A storage control unit connected to an external storage unit for storing data as a plurality of records and to a central processing unit, said storage control unit controlling data transfer between said external storage unit and said central processing unit, wherein said storage control unit has a controller for disconnecting said storage control unit from said central processing unit after receiving a search command from said central processing unit when said storage control unit searches data with respect to a plurality of said records.

8. A storage subsystem connected to a central processing unit, said storage subsystem having an external storage unit for storing data as a plurality of records and a storage control unit for controlling data transfer between said external storage unit and said central processing unit, wherein said storage subsystem has a controller which operates such that upon reception of a search command from said central processing unit, said storage subsystem supplies a signal to said central processing unit, said signal indicating a termination of operation of said storage subsystem with said central processing unit, disconnects said central processing unit, and performs a search of search data in a cache memory having a plurality of said records.

9. A storage subsystem according to claim 8, wherein said controller further operates such that said storage subsystem checks whether said cache memory has search data, and if said cache memory has the search data, said storage subsystem issues a quasi completion record to said central processing unit to disconnect said central processing unit, and if said cache memory has no search data, said storage subsystem reads search data from said external storage unit and loads the read data in said cache memory, and issues a quasi completion record to said central processing unit to disconnect said central processing unit.

10. A storage control unit connected to an external storage unit for storing data as a plurality of records, each record having a count field, a key field, and a data field, and to a central processing unit, said storage control unit having a cache memory and controlling data transfer between said external storage unit and said central processing unit, wherein said storage control unit has a controller which operates such that upon reception of a key search command from said central processing unit, said storage control unit issues a quasi completion report to said central processing unit, disconnects said central processing unit, and executes a key field comparison with a search track having a plurality of said records in said cache memory, and if a condition of said key field comparison is satisfied, said storage control unit issues a completion report to said central processing unit to terminate a key search, and if the condition of said key field comparison is not satisfied, said storage control unit executes said key field comparison with the next track.

11. A storage control unit according to claim 10, wherein said controller further operates such that said storage control unit checks whether said cache memory has a search track, and if said cache memory has a search track, said storage control unit issues said quasi completion report to said central processing unit and disconnects said central processing unit, and if said cache memory has no search track, said storage control unit reads a search track from said external memory, issues said quasi completikon report to said central processing unit, and disconnects said central processing unit.

12. A data transfer method for a data transmission line between a storage control unit and a central processing unit, said storage control unit being connected to an external storage unit for storing data and controlling said external storage unit, and said central processing unit issuing an input/output command to said storage control unit, wherein when said central processing unit transmits a search request signal, said storage control unit transmits a termination signal to said central processing unit, said termination signal indicating a termination of operation of said storage control unit with said central processing unit, and disconnects said data transmission line.

13. A data transfer method for a data transmission line between a storage control unit and a central processing unit, said storage control unit being connected to an external storage unit for storing data and controlling said external storage unit, and said central processing unit issuing an input/output command to said storage control unit, wherein when said central processing unit transmits a search request signal, said storage control unit transmits a termination signal to said central processing unit, said termination signal indicating a termination of operation of said storage control unit with said central processing unit, said storage control unit or said central processing unit disconnects a logical connection between said storage control unit and said central processing unit, and thereafter said storage control unit transmits a completikon report to logically connect said central processing unit to said storage control unit.

14. A data transfer method for a data transmission line between a storage control unit and a central processing unit, said storage control unit being connected to an external storage unit for storing data and controlling said external storage unit, and said central processing unit issuing an input/output command to said storage control unit, wherein when said central processing unit transmits a key search request, said storage control unit transmits a quasi completion report, intercepts data transfer over said data transmission line between said central processing unit and said storage control unit, and after completion of a key search by said storage control unit, said storage control unit transmits a completion report to resume data transfer over said data transmission line.

* * * * *